(No Model.)

W. M. JONES.
VEHICLE WHEEL.

No. 538,167.  Patented Apr. 23, 1895.

Witnesses
Chas. A. Ford.
J. H. Riley

Inventor
William M. Jones
By his Attorneys
C. A. Snow & Co.

UNITED STATES PATENT OFFICE.

WILLIAM M. JONES, OF CERRO GORDO, TENNESSEE.

VEHICLE-WHEEL.

SPECIFICATION forming part of Letters Patent No. 538,167, dated April 23, 1895.

Application filed October 24, 1894. Serial No. 626,867. (No model.)

*To all whom it may concern:*

Be it known that I, WILLIAM M. JONES, a citizen of the United States, residing at Cerro Gordo, in the county of Hardin and State of Tennessee, have invented a new and useful Vehicle-Wheel, of which the following is a specification.

The invention relates to improvements in wheels.

The object of the present invention is to improve the construction of wheels, to increase their strength and durability, and to provide a simple and inexpensive brace, which may be readily applied to any ordinary construction of vehicle wheel.

The invention consists in the construction and novel combination and arrangement of parts, hereinafter fully described, illustrated in the accompanying drawings and pointed out in the claim hereto appended.

Figure 1:
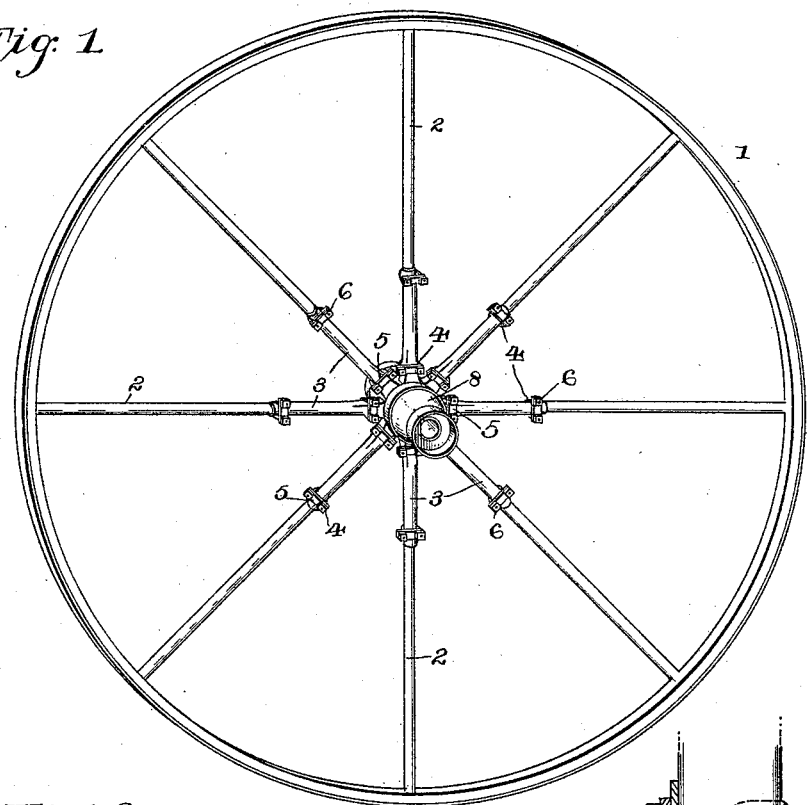
Figure 2:
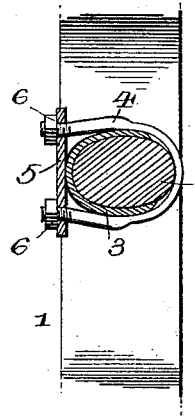
Figure 4:
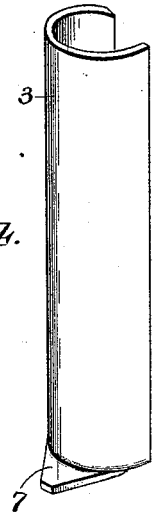
Figure 3:
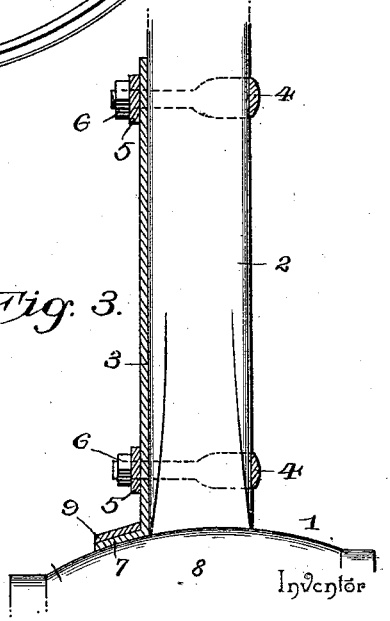

In the drawings, Figure 1 is a perspective view of a wheel provided with braces constructed in accordance with this invention. Fig. 2 is a sectional view taken transversely of one of the spokes. Fig. 3 is a similar view taken longitudinally of a spoke. Fig. 4 is a detail perspective view of one of the braces.

Like numerals of reference indicate corresponding parts in all the figures of the drawings.

1 designates a vehicle wheel having its spokes 2 supported by metal braces 3, which are semi-tubular, and extend around about one-half of the spokes. The semi-tubular braces are disposed on the outer faces of the spokes at the inner portions thereof, and are secured to the spokes by clips 4, located adjacent to the terminals of the braces, and constructed in the ordinary manner, being connected by tie-plates 5, and having threaded terminals receiving nuts 6. The semi-tubular brace 3 extends along the outer face of a spoke, and embraces the outer side of the same. The tie plate or clip plate 5 bears against the brace, and the rounded portion of the clip is arranged at the inner side of the spoke. By this arrangement, the brace and the clip are so disposed with relation to each other, that they conform to the configuration of the spoke.

The lower or inner ends of the braces are provided with outward extending flanges 7, arranged on the outer portion of the hub 8 of the wheel and secured thereto by a band 9, which embraces the outer portion of the hub. The flanges 7 of the tubular braces are formed integral with the latter, and the band 9 serves for retaining all of the flanges of the braces on the hub.

It will be seen that the braces are simple and comparatively inexpensive in construction, that they conform to the configuration of the spokes, and that they are adapted to be readily applied to any ordinary construction of vehicle wheel. It will also be seen that they greatly increase the strength and durability of a wheel, and may be applied to wheels after the same have been in use.

Changes in the form, proportion, and the minor details of construction may be resorted to without departing from the principle or sacrificing any of the advantages of this invention.

What I claim is—

The combination with a wheel, of a semi-tubular brace arranged at the inner end of one of the spokes and extending along the same and embracing the inner portion of the spoke from the hub outward, said brace being provided at its inner end with a flange arranged on the outer face of the hub, a continuous band encircling the hub and clamping the flange thereon, clips embracing the said spoke and having their curved portions arranged at one side thereof opposite the brace and conforming to the configuration of the spoke, and clip plates bearing against the brace and having openings receiving the sides of the clips, and secured to the same by nuts, substantially as described.

In testimony that I claim the foregoing as my own I have hereto affixed my signature in the presence of two witnesses.

WILLIAM M. JONES.

Witnesses:
G. W. BINGHAM,
W. C. WOOD.